US010163024B2

(12) United States Patent
Yoshimura et al.

(10) Patent No.: US 10,163,024 B2
(45) Date of Patent: Dec. 25, 2018

(54) ELECTRONIC DEVICE AND ELECTRONIC DEVICE CONTROL METHOD

(71) Applicant: KYOCERA Document Solutions Inc., Osaka (JP)

(72) Inventors: Sachiko Yoshimura, Osaka (JP); Yumi Nakagoshi, Osaka (JP); Akihiro Umenaga, Osaka (JP); Naoto Hanatani, Osaka (JP); Hironori Hayashi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 21 days.

(21) Appl. No.: 15/614,827

(22) Filed: Jun. 6, 2017

(65) Prior Publication Data
US 2018/0005065 A1    Jan. 4, 2018

(30) Foreign Application Priority Data

Jun. 29, 2016 (JP) ................................ 2016-129429

(51) Int. Cl.
G06K 9/18       (2006.01)
G06K 9/20       (2006.01)
G06F 17/27      (2006.01)
G06F 17/30      (2006.01)
G06K 9/72       (2006.01)

(52) U.S. Cl.
CPC ....... G06K 9/2063 (2013.01); G06F 17/2735 (2013.01); G06F 17/30 (2013.01); G06K 9/723 (2013.01); G06K 2207/1012 (2013.01)

(58) Field of Classification Search
USPC ....................................................... 382/282
See application file for complete search history.

(56) References Cited

U.S. PATENT DOCUMENTS

2010/0303114 A1* 12/2010 Kosugi ................. B82Y 20/00
                                                    372/45.01
2013/0191108 A1*  7/2013 Anisimovich ........ G06F 17/289
                                                        704/4

(Continued)

FOREIGN PATENT DOCUMENTS

JP         2005-167875 A        6/2005

Primary Examiner — Jerome Grant, II
(74) Attorney, Agent, or Firm — IP Business Solutions, LLC

(57) ABSTRACT

Provided are: an acquisition section that acquires image data; a detection section that detects a marker portion indicated in the image data; a communication section that performs communication with either one or a plurality of external servers including at least one of a plurality of dictionary functions; a processing section that (i) specifies, from the dictionary functions, a dictionary function in accordance with a type of the marker portion, and (ii) causes the communication section to transmit, to the external server including the specified dictionary function, an instruction to search for a text indicated by the marker portion, and for information related to the text, by using the dictionary function; and a generation section that generates a glossary including the received information related to the text upon reception of the information related to the text as a search result from the external server by the communication section.

13 Claims, 14 Drawing Sheets

(56) References Cited

U.S. PATENT DOCUMENTS

| | | | |
|---|---|---|---|
| 2015/0234799 A1* | 8/2015 | Cho | G06F 3/04842 |
| | | | 715/708 |
| 2017/0075877 A1* | 3/2017 | Lepeltier | G06F 17/2705 |
| 2017/0076070 A1* | 3/2017 | Bridges | G06F 19/00 |
| 2018/0095641 A1* | 4/2018 | Lee | G06F 3/04842 |
| 2018/0205726 A1* | 7/2018 | Chari | H04L 63/0861 |

* cited by examiner

| COLOR OF MARKER | DICTIONARY | CLOUD SERVICE |
|---|---|---|
| RED | XXX ENGLISH DICTIONARY | ○○ SERVICE |
| BLUE | YYY ENGLISH DICTIONARY | ×× SERVICE |
| GREEN | ZZZ ENGLISH-JAPANESE DICTIONARY | △△ SERVICE |
| YELLOW | ○× ENGLISH-ENGLISH DICTIONARY | □□ SERVICE |
| ORANGE | IT TERMINOLOGICAL DICTIONARY | ○△ SERVICE |
| PURPLE | LOW TERMINOLOGICAL DICTIONARY | ×□ SERVICE |

160
STORAGE SECTION

Fig.8A

| WORD | PRONUNCIATION SYMBOL | MEANING |
|---|---|---|
| rainy season | réini síːzn | Long rainy season around June to July, and long rain that falls in that period. |
| typhoon | tɑifúːn | Strong low atmospheric pressure that overlies Japanese Islands and East Asian Continent. Occurs from end of summer to fall. |
| land | lˈænd | 1. To arrive on the land.<br>2. Foreign cultures and capitals, etc. begin to penetrate. |

Fig.8B

| WORD/IDIOM | PRONUNCIATION SYMBOL | MEANING |
|---|---|---|
| get carried away | - | 1. [波などに]さらわれる。<br>2. 調子に乗る。夢中になる。 |
| fragrance | fréigrəns | 香り、香料。 |
| flower | fláuɚ | [自動]<br>1. 花が開花する。<br>2. [才能などが]開く。<br>3. 成熟する。<br>[名]<br>1. 花<br>2. 最盛期<br>3. 手本 |

Fig.8C

| TERM | DESCRIPTION |
|---|---|
| search engine | Search engine is a site that permits search for information on the Internet. It can typically be used for free since it is operated with advertising commission paid by firms posted on the site. |
| cloud-computing | Cloud-computing is a method of using, through the internet service, software and data which are conventionally used on, for example, a PC. |

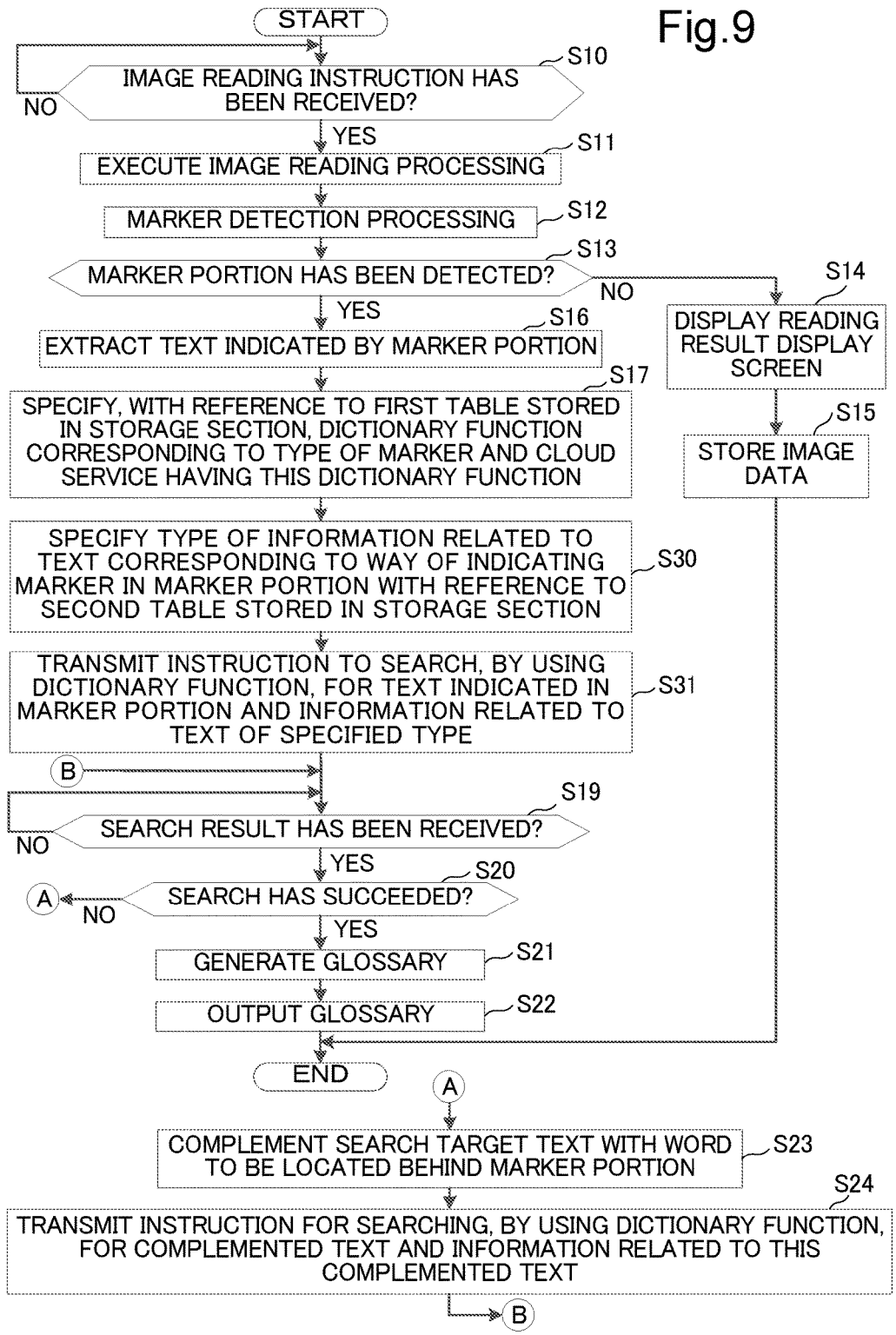

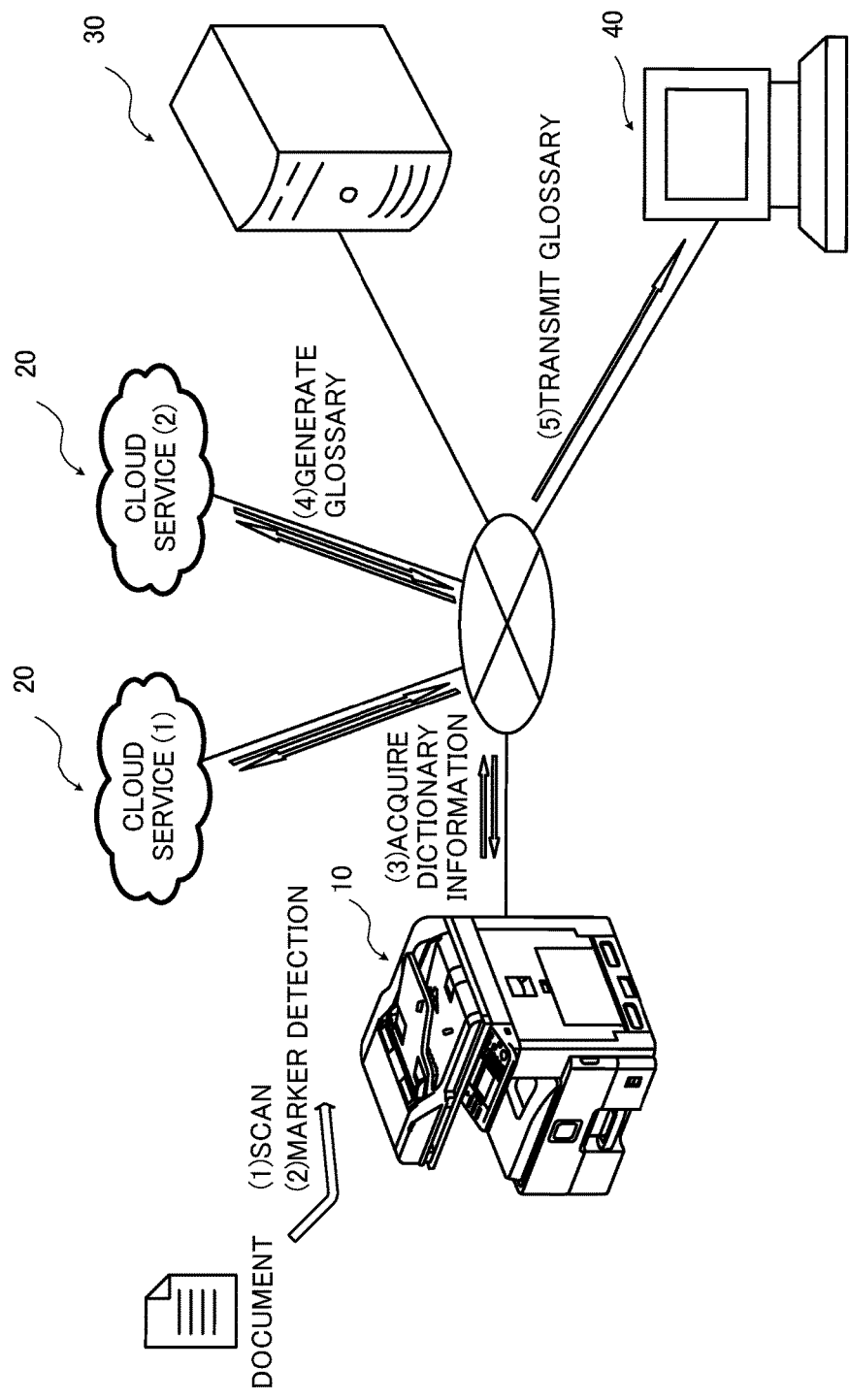

ELECTRONIC DEVICE AND ELECTRONIC DEVICE CONTROL METHOD

INCORPORATION BY REFERENCE

This application claims priority to Japanese Patent Application No. 2016-129429 filed on 29 Jun. 2016, the entire contents of which are incorporated by reference herein.

BACKGROUND

This disclosure relates to an electronic device and an electronic device control method, and more specifically to a technology of extracting a marker portion indicated by image data of a document.

For example, a technology with an image reader has been suggested for determining whether or not a marker portion is included in image data indicating a document and deleting an image indicated in this marker portion, if any is included, or replacing the aforementioned image with a monochromatic image. With the aforementioned technology, it is possible for a user to mark a desired region in the document with a marker pen to thereby delete it from a target to be read by the image reader.

SUMMARY

As one aspect of this disclosure, a technology obtained by further improving the aforementioned technology will be suggested.

An electronic device according to one aspect of this disclosure includes: an acquisition section, a detection section, a communication section, a processing section, and a generation section. The acquisition section acquires image data indicating a document. The detection section analyzes the image data and detects a marker portion indicated in the image data. The communication section performs communication with either one or a plurality of external servers including at least one of a plurality of dictionary functions. The processing section (i) specifies, from the plurality of dictionary functions included in either the one or the plurality of external servers, a dictionary function in accordance with a type of the marker portion, and (ii) causes the communication section to transmit, to the external server including the specified dictionary function, an instruction to search for a text indicated by the marker portion, and for information related to the text, by using the dictionary function. The generation section, upon reception of information related to the text as a search result from the external server by the communication section, generates a glossary including the received information related to the text.

An electronic device according to another aspect of this disclosure includes: an acquisition section, a marker detection section, a communication section, a marker processing section, and a glossary generation section. The acquisition section acquires image data indicating a document. The marker detection section analyzes the image data and detects an instructed portion indicated in the image data. The communication section performs communication with either one or a plurality of external servers including at least one of a plurality of dictionary functions. The marker processing section (i) specifies, from the plurality of dictionary functions included in either the one or the plurality of external servers, a dictionary function in accordance with a type of the instructed portion, and (ii) causes the communication section to transmit, to the external server including the specified dictionary function, an instruction to search for a text indicated by the instructed portion, and for information related to the text, by using the dictionary function. The glossary generation section, upon reception of information related to the text as a search result from the external server by the communication section, generates a glossary including the received information related to the text.

An electronic device control method according to another aspect of this disclosure refers to a method for controlling an electronic device including a communication section performing communication with either one or a plurality of external servers including at least one of a plurality of dictionary functions. The method comprising the steps of: acquiring image data indicating a document; analyzing the image data and detecting a marker portion indicated in the image data; (i) specifying, from the plurality of dictionary functions included in either the one or the plurality of external servers, a dictionary function in accordance with a type of the marker portion, and (ii) causing the communication section to transmit, to the external server including the specified dictionary function, an instruction to search for a text indicated by the marker portion, and for information related to the text, by using the dictionary function; and upon reception of information related to the text as a search result from the external server by the communication section, generating a glossary including the received information related to the text.

BRIEF DESCRIPTION OF THE DRAWINGS

FIGS. 8A to 8C are diagrams each illustrating one example of a glossary generated by the image forming apparatus according to one example of this disclosure.

FIG. 9 is a flowchart illustrating a flow of operation performed by an image forming apparatus according to Modified Example 1.

FIG. 11B is a conceptual diagram illustrating a flow of operation performed by an image forming apparatus according to Modified Example 3.

DETAILED DESCRIPTION

Hereinafter, an image forming apparatus as one example of an electronic device according to one embodiment of this disclosure and a method for controlling such an image forming apparatus will be described with reference to the drawings.

Figure 1:
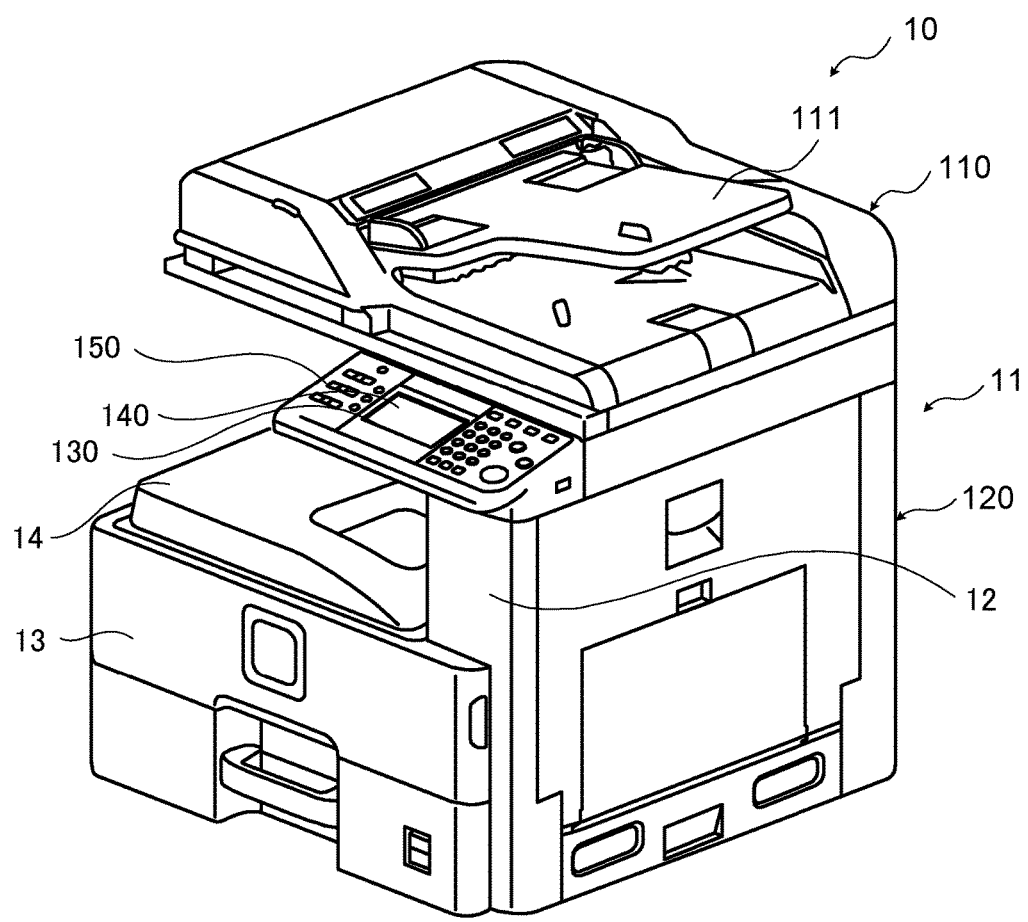
FIG. 1 is a perspective view illustrating an image forming apparatus according to one embodiment of this disclosure.
Figure 2:
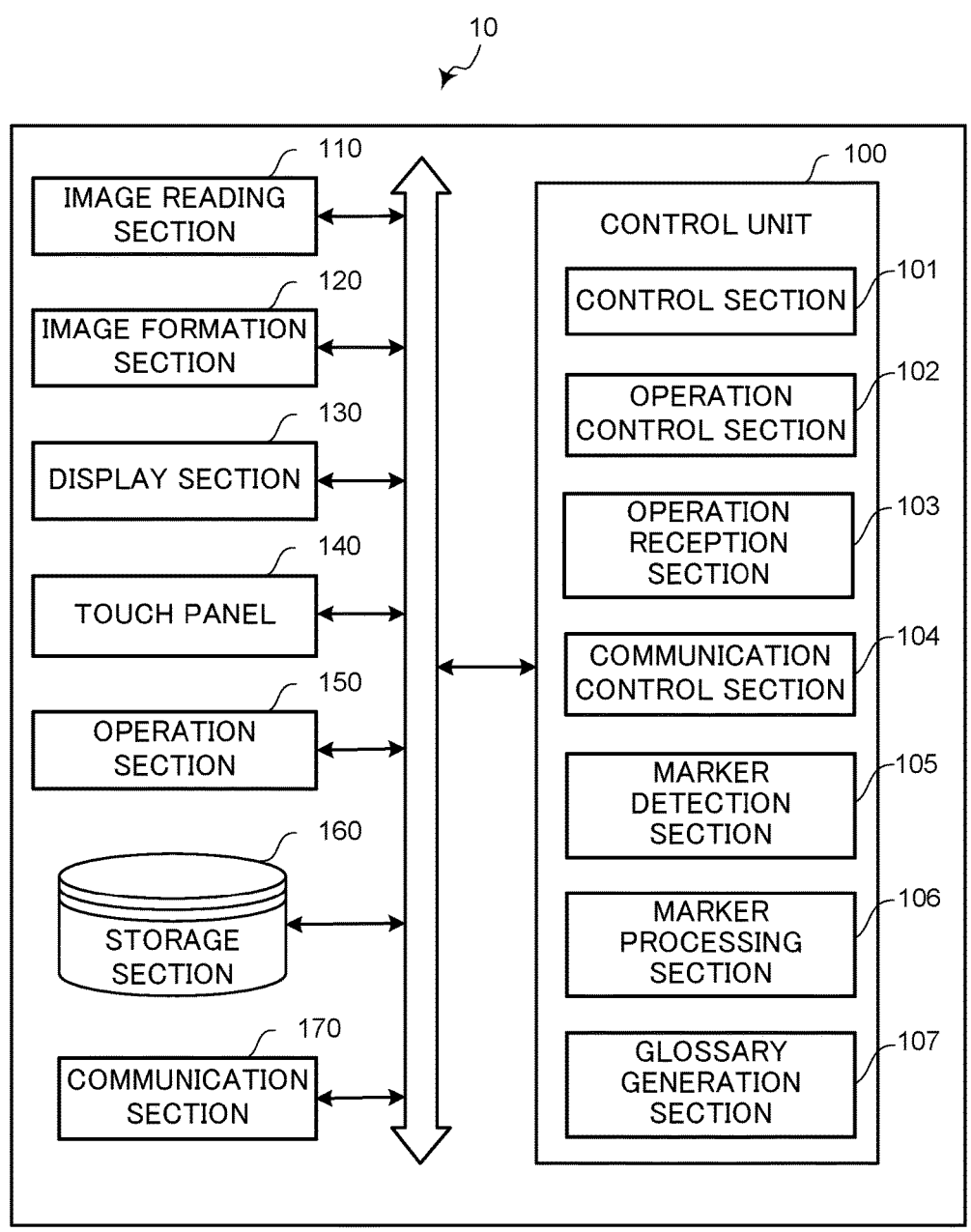
FIG. 2 is a block diagram illustrating inner configuration of the image forming apparatus according to one embodiment of this disclosure.

FIG. 1 is a perspective view illustrating the image forming apparatus according to one embodiment of this disclosure. FIG. 2 is a block diagram illustrating inner configuration of the image forming apparatus.

The image forming apparatus 10 is a multifunction peripheral combining together a plurality of functions such as a copy function, a printer function, a scanner function, and a facsimile function. The image forming apparatus 10 is roughly composed of: an apparatus body 11; an image reading section 110 which is arranged above the apparatus body 11; and a coupling section 12 which is provided between the image reading section 110 and the apparatus body 11.

The apparatus body 11 includes an image formation section 120, a paper feed section 13, etc.

To perform image reading operation by the image forming apparatus 10, the image reading section 110 (acquisition section) reads a document loaded on a document loader 111 to generate (acquire) image data indicating this document under control by a operation control section 102 to be described later on. This image data is stored into a storage section 160. Note that the image forming apparatus 10 may acquire the image data not through the document reading by the image reading section 110, but may acquire the image data indicating the document through reception of the image data from another information processor such as a personal computer (PC) by a communication section 170.

To perform image formation operation by the image forming apparatus 10, based on, for example, the image data stored in the storage section 160, the image formation section 120 forms a toner image on recording paper fed from the paper feed section 13 under control by the operation reception section 102. Then the toner image formed on the recording paper is thermally fixed by a fixing section, not illustrated. The recording paper on which the image has already been formed and which has already been subjected to fixing processing is discharged onto a discharge tray 14.

A display section 130 and an operation section 150 are arranged at a front of a casing forming an outline of the image forming apparatus 10. The display section 130 includes a liquid crystal display (LCD) or an organic light-emitting diode (OLED) display. The display section 130 displays, for example, a menu screen under control by the operation reception section 102.

A touch panel 140 is arranged on a front surface of the display section 130. The touch panel 140 is a touch panel of a so-called resistance film type or capacitance type, which detects user's touch on the touch panel 140 together with a position of the aforementioned touch.

The operation section 150 is a hard key including, for example, a menu key for calling up a menu, arrow keys for moving a focus of a GUI forming the menu, and a determine key for performing confirmation operation on the GUI forming the menu.

The storage section 160 is a large-capacity storage device such as an HDD.

The communication section 170 is a network interface formed of a communication module such as a wireless LAN board.

The image forming apparatus 10 further includes a control unit 100. The control unit 100 is composed of: a central processing unit (CPU), a random access memory (RAM), a read only memory (ROM), etc. The control unit 100 functions as a control section 101, the operation control section 102, an operation reception section 103, a communication control section 104, a marker detection section 105, a marker processing section 106, and a glossary generation section 107 as a result of execution of programs stored in the aforementioned ROM or the storage section 160 by the aforementioned CPU. Note that each of the aforementioned structures of the control unit 100 may be formed of a hard circuit without depending on program-based operation.

The control section 101 performs overall operation control of the image forming apparatus 10.

The operation reception section 103 has a function of receiving, based on a detection signal outputted from the touch panel 140, user operation performed on the touch panel 140. The operation reception section 103 also has a function of receiving user operation performed by using the operation section 150 such as the hard key.

Figure 3:
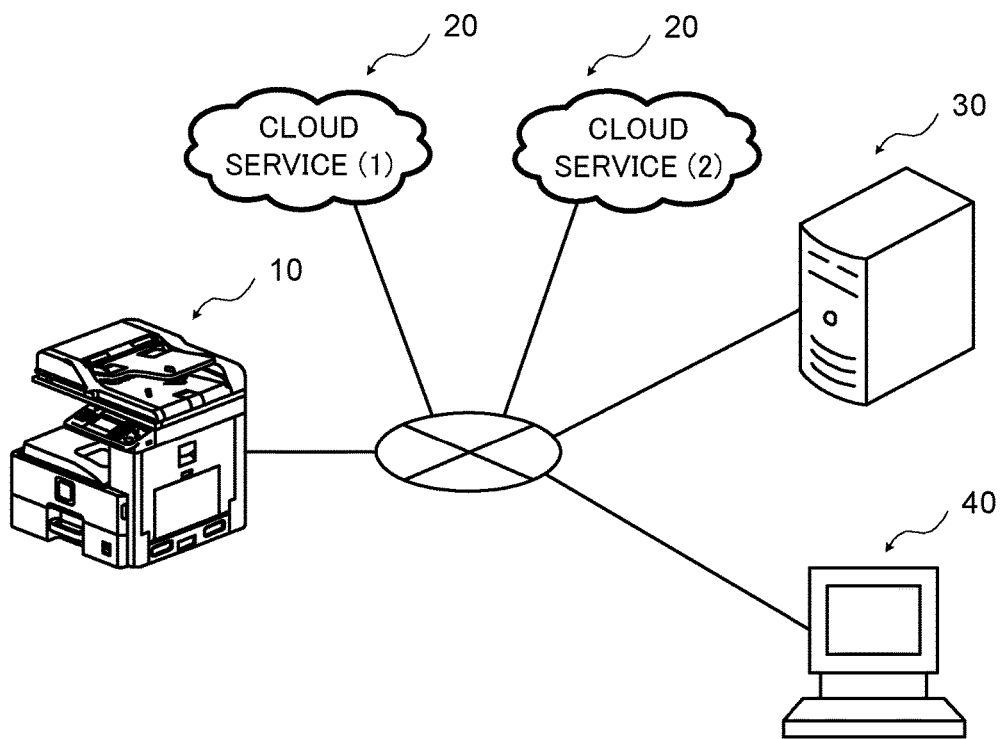
FIG. 3 is a diagram illustrating configuration such that connection to the image forming apparatus according to one embodiment of this disclosure is made via the network.

The communication control section 104 has a function of controlling communication operation performed by the communication section 170. FIG. 3 is a diagram illustrating configuration such that connection to the image forming apparatus 10 is made via the network. In an example illustrated in this figure, the image forming apparatus 10 is connected to, for example, a plurality of cloud services 20, a server 30, and a PC 40. A cloud service in general provides various functions such as a web mail function and a calendar function via the network. A dedicated server (external server) is actually provided, and this dedicated server performs information processing to thereby provide the aforementioned services. The plurality of cloud services 20 provides dictionary functions in this embodiment. For example, one of the plurality of cloud services 20 provides the dictionary function for an English dictionary and another one thereof provides the dictionary function for an English-Japanese dictionary.

The operation control section 102 has a function of controlling the image reading operation performed by the image reading section 110, display operation performed by the display section 130, etc.

The marker detection section 105 (detection section) has a function of analyzing image data acquired through the document reading by the image reading section 110 and detecting a marker portion of the document marked by a marker. The marker detection section 105 also has a function of extracting a text indicated by the detected marker portion.

The marker processing section 106 (processing section) has a function of causing the communication section 170 to perform data transmission and reception to and from the cloud services 20 via the communication control section 104, causing the dictionary function of the cloud service 20 to generate information related to a text extracted by the marker detection section 105, such as a meaning of the text, and acquiring this information. The information related to a text here includes, for example, a meaning of the text and a reading, or a pronunciation symbol of the text.

The glossary generation section 107 (generation section) has a function of, upon reception of the information related to the text as a search result from the cloud service 20 by the communication section 170, generating a glossary including the received information related to the text.

Figure 4:
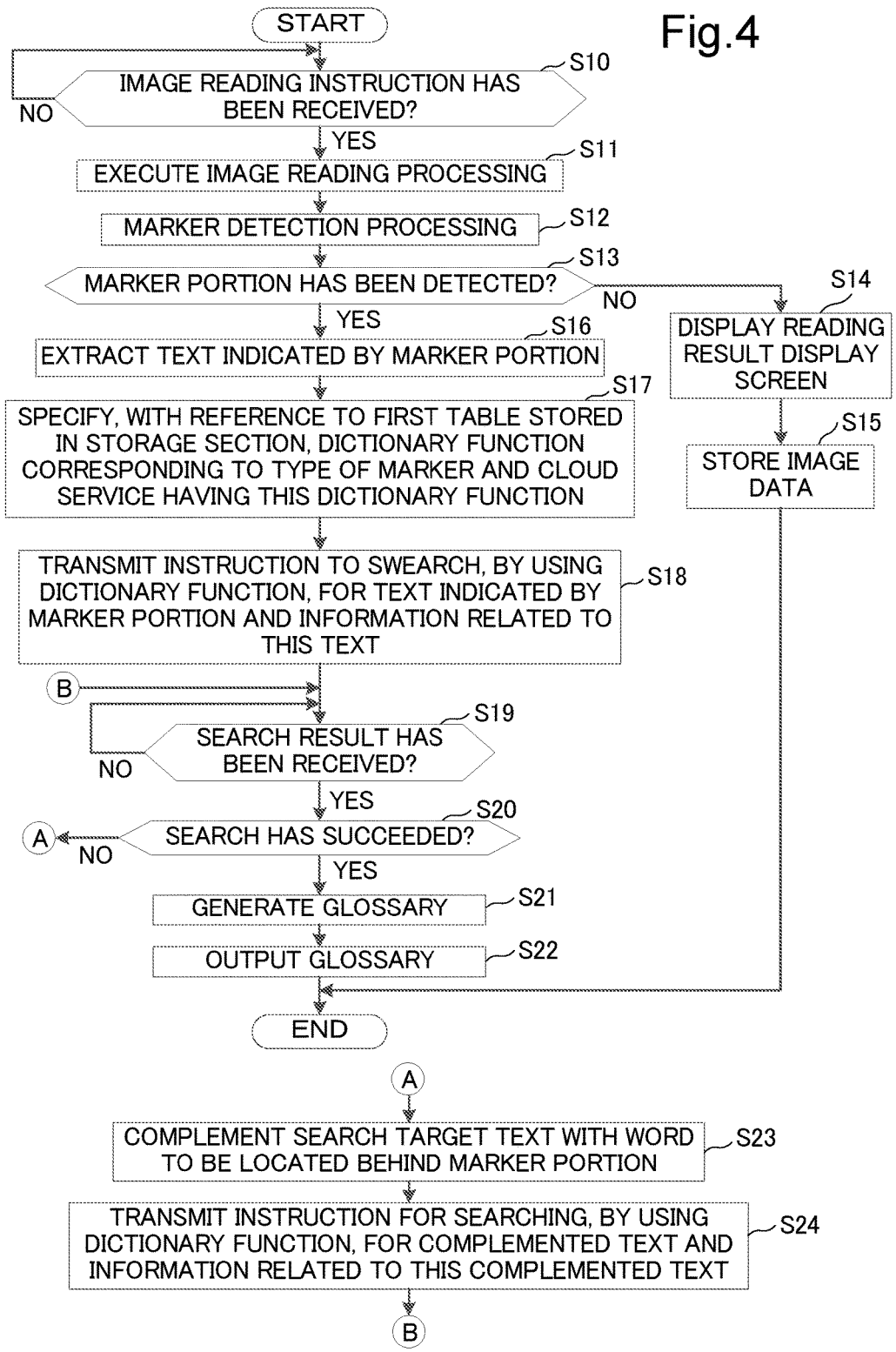
FIG. 4 is a flowchart illustrating a flow of operation performed by the image forming apparatus according to one embodiment of this disclosure.

Subsequently, operation performed by the image forming apparatus 10 including the aforementioned configuration will be described. FIG. 4 is a flowchart illustrating a flow of the operation performed by the image forming apparatus 10.

Upon reception of an image reading instruction by the operation reception section 103 (YES in step S10), the operation control section 102 controls the image reading section 110 to execute the image reading operation (step S11). Through the processing in S11, the image reading section 110 acquires image data indicating a document.

The marker detection section 105 analyzes the image data acquired through the processing in step S11 by the image reading section 110 and performs marker detection processing of detecting a marker portion included in the image data (step S12).

When no marker portion has been detected through processing in step S12 (NO in step S13), the display section 130 displays a display screen indicating a result of the document reading under control by the operation control section 102 (step S14). This display screen indicates the image data acquired through the document reading by the image reading section 110.

After the processing in step S14, the operation control section 102 causes the storage section 160 to store the image data (step S15), and ends the document reading processing.

On the other hand, when any marker portion has been detected through the processing in step S12 (YES in step S13), the marker detection section 105 extracts a text indicated by the detected marker portion (step S16).

Then in accordance with a type of a marker of the marker portion detected through the processing in step S12, the marker detection section 105 specifies the dictionary function and the cloud service 20 having this dictionary function (step S17). The type of the marker here corresponds to a type specified based on at least any one of elements including a color of the marker, a line type of the marker, and a thickness of the marker. This embodiment is described based on the assumption that the type of the marker is specified by the color (for example red, blue or green) of the marker, but those markers of the same color but of different line types (for example, a solid line and a dotted line) and different thicknesses may be treated as markers of different types.

Figure 5:
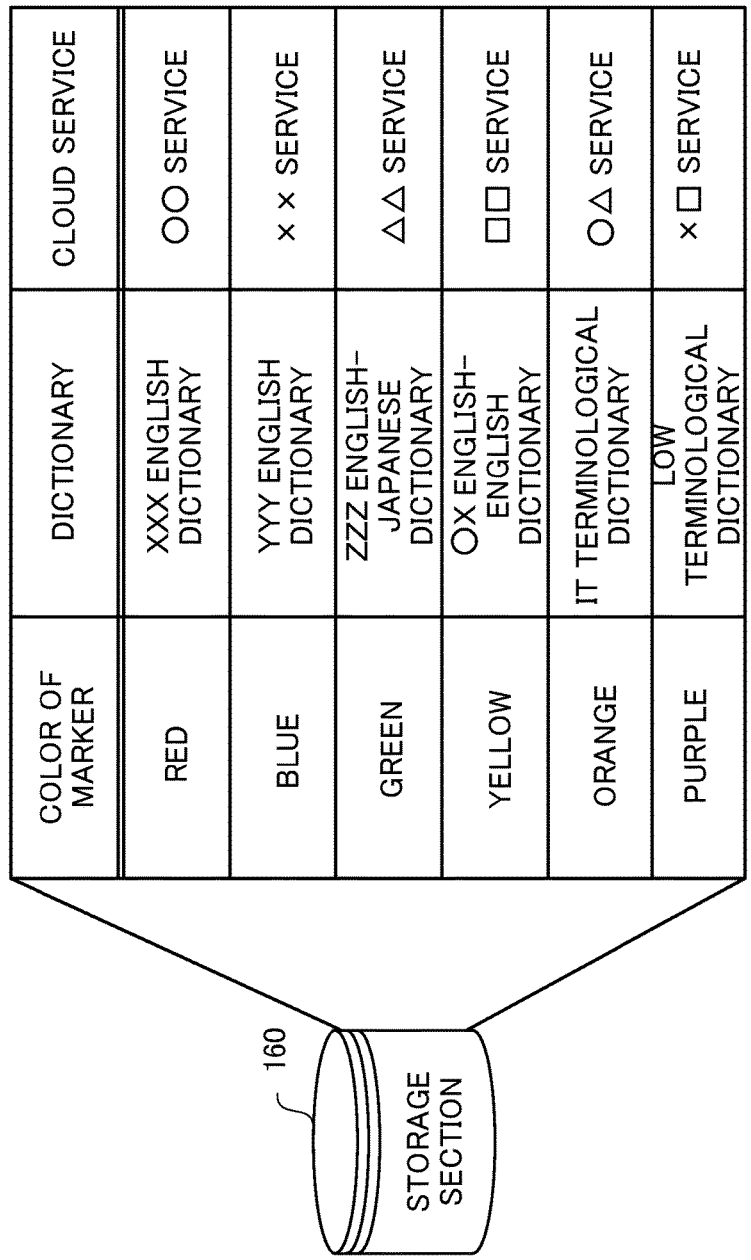
FIG. 5 is a diagram illustrating one example of a first table stored in a storage section of the image forming apparatus according to one embodiment of this disclosure.

The storage section 160 here previously stores a first table indicating information for specifying, for each type of a plurality of markers, the corresponding dictionary function and the cloud service 20 (external server) having this dictionary function. FIG. 5 is a diagram illustrating one example of the first table stored in the storage section 160. In the example illustrated in this figure, names of the cloud services 20 are stored as information for specifying the cloud services 20, but instead of the names of the cloud services 20, uniform resource locators (URLs) or application programming interfaces (API) providing the cloud services 20 may be stored.

Figure 6A:
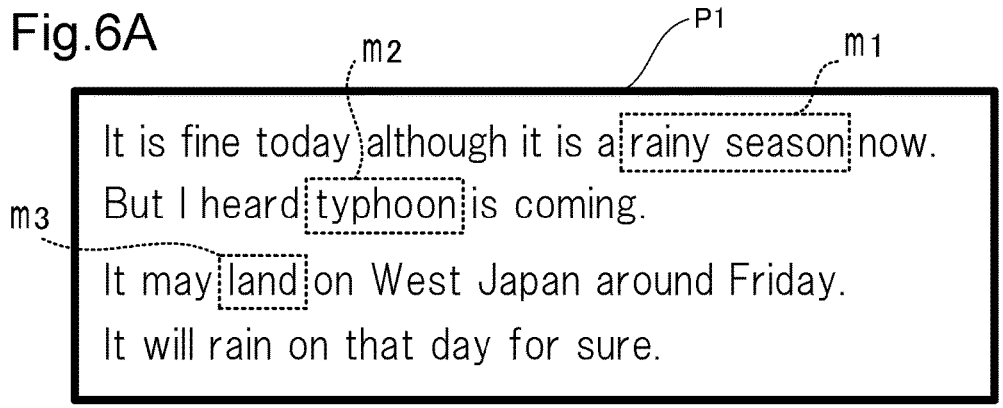
FIGS. 6A to 6C are diagrams each illustrating one example of a document to be processed by the image forming apparatus according to one embodiment of this disclosure.
Figure 6B:
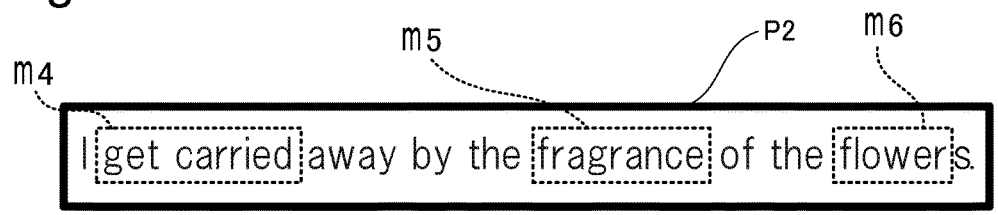
Figure 6C:
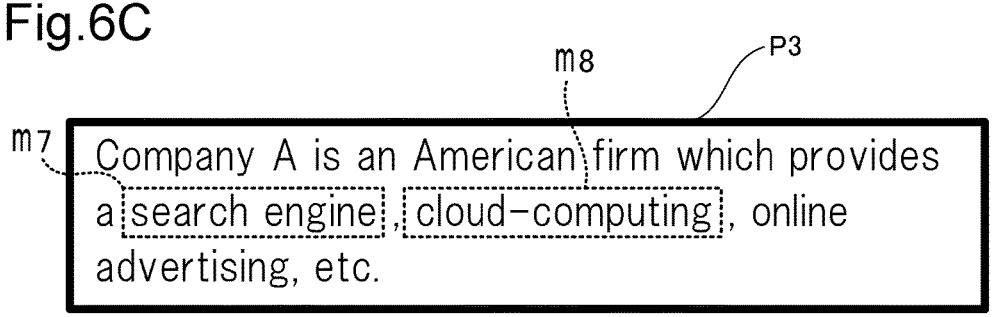

FIGS. 6A to 6C are diagrams each illustrating one example of a document to be processed. In the example illustrated in FIG. 6A, three portions (portions surrounded by dotted lines m1, m2, and m3) of a document P1 are marked in red. In this case, with reference to the first table stored in the storage section 160, the marker processing section 106 specifies "XXX English dictionary" as a dictionary corresponding to the marker type "red" and specifies "∘∘ service" as the cloud service.

In the example illustrated in FIG. 6B, three portions (portions surrounded by dotted lines m4, m5, and m6) of a document P2 are marked in green. In this case, with reference to the first table stored in the storage section 160, the marker processing section 106 specifies "ZZZ English-Japanese Dictionary" as a dictionary corresponding to the marker type "green" and specifies "ΔΔ service" as the cloud service.

In the example illustrated in FIG. 6C, two portions (portions surrounded by dotted lines m7 and m8) of a document P3 are marked in orange. In this case, with reference to the first table stored in the storage section 160, the marker processing section 106 specifies "IT terminological dictionary" as a dictionary corresponding to the marker type "orange" and specifies "∘Δ service" as the cloud service.

Figure 7:
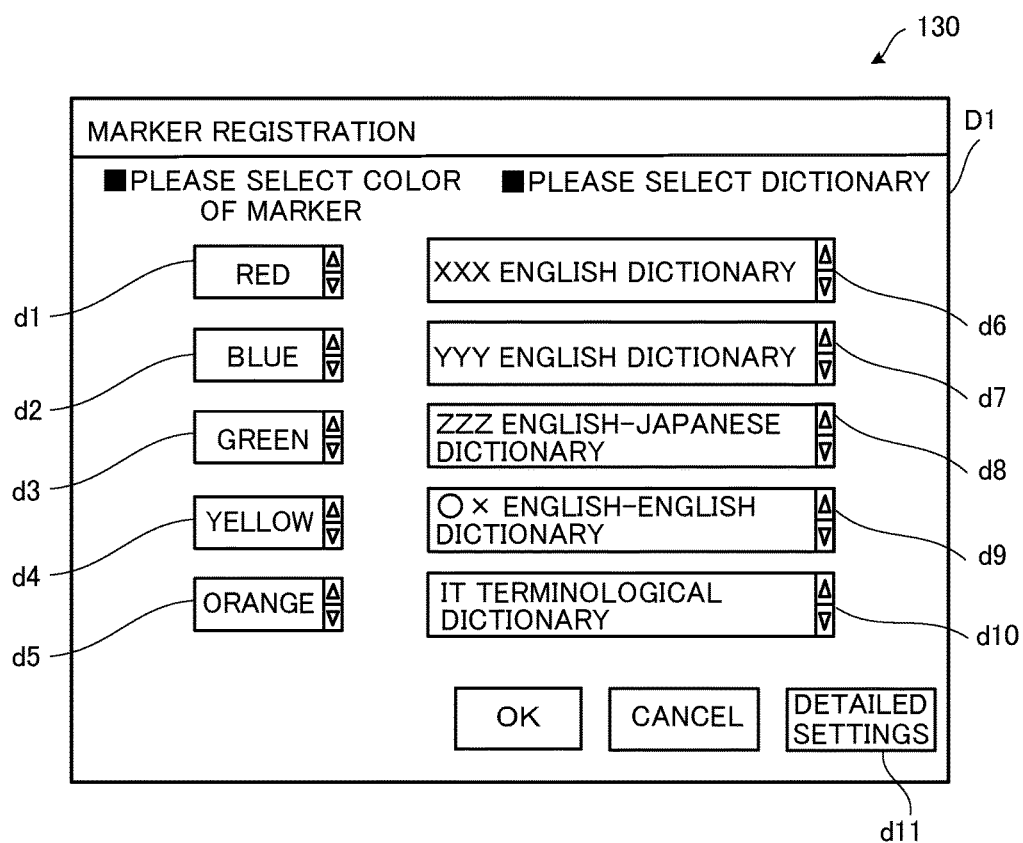
FIG. 7 is a diagram illustrating one example of a marker registration screen displayed at a display section of the image forming apparatus according to one embodiment of this disclosure.

Note that the display section 130 displays a marker registration screen D1 illustrated in FIG. 7 under control by the operation control section 102. The marker registration screen D1 is provided with pull-down menus d1 to d5 which permit registration, changing, or deletion of the color of the marker. The user can operate the pull-down menus d1 to d5 to thereby register, change, or delete the registered color of the marker.

The marker registration screen D1 is also provided with pull-down menus d6 to d10 which permit registration, alteration, or deletion of the dictionary corresponding to each color of the marker. The user can operate the pull-down menus d6 to d10 to thereby register, alter, or delete the dictionary corresponding to the color of the maker.

Further, the marker registration screen D1 is provided with a details setting button d11. Upon reception of operation of pressing the details setting button d11 by the operation reception section 103, the operation control section 102 causes the display section 130 to display a screen for receiving inputting of the URL or the API for specifying the cloud service 20 which provides the dictionary function.

Upon reception of operation on the aforementioned pull-down menus d1 to d11 or the details setting button d11, the operation reception section 103 rewrites the first table stored in the storage section 160.

Referring to FIG. 4, the marker processing section 106 causes the communication section 170 to transmit, to the cloud service 20 specified through processing in step S17, an instruction to search for a text indicated by the marker portion, and for information related to this text, by using the dictionary function (step S18).

Note that when a plurality of marker portions have been detected from the image data by the marker detection section 105, the marker processing section 106 performs the aforementioned processing in steps S16 to 18 for each of the plurality of marker portions.

After the processing in step S18, upon reception of the information related to the text, such as a meaning of the text, as a search result from the cloud service 20 by the communication section 170 (YES in step S19 and YES in step S20), the glossary generation section 107 generates a glossary including the received information related to the text (step S21).

In recent years, various dictionaries are released as on-the-web services, users can get access to sites providing such services and input a text included in a document to investigate information related to the text such as a meaning of the text.

However, in this case, the user is required to (i) get access to the site providing an appropriate dictionary service and (ii) perform operation of inputting a text on the site. Moreover, to investigate meanings of a plurality of texts, the user is required to perform, in addition to a plurality of times of the above operation (i) and (ii), (iii) operation of summarizing meanings of the plurality of texts in one sentence. The aforementioned operation is bothersome to the user, which is disadvantageous in terms of user-friendliness.

On the contrary, in this embodiment, for example, in a case where a document to be processed has contents illustrated in FIG. 6A, the glossary generation section 107 generates a glossary as illustrated in FIG. 8A. In an example illustrated in this figure, for the texts extracted by the marker detection section 105, a glossary is generated which includes pronunciation symbols and meanings of the texts as results of search on the XXX English dictionary.

In a case where a document to be processed has contents illustrated in FIG. 6B, the glossary generation section 107 generates a glossary as illustrated in FIG. 8B. In an example illustrated in this figure, for the texts extracted by the marker detection section 105, a glossary is generated which includes pronunciation symbols (readings) of the texts and a meaning of the texts as results of search on the ZZZ English-Japanese dictionary.

In a case where a document to be processed has contents illustrated in FIG. 6C, the glossary generation section 107 generates a glossary as illustrated in FIG. 8C. In an example illustrated in this figure, for the texts extracted by the marker detection section 105, the glossary is generated which includes meanings of the texts as a result of search on the IT terminological dictionary. As described above, it is possible in this embodiment to provide a glossary including information related to a text included in a document, such as a meaning of the text, only through simple user operation.

After the glossary generation, this glossary is outputted by predefined output means (an output section) (step S22). For example, the operation control section 102 causes the image formation section 120 to form, on recording paper, an image indicating this glossary. In this case, the operation control section 102 functions as the aforementioned output means. Moreover, the communication control section 104 transmits the glossary to another electronic device such as the PC 40 connected to the image forming apparatus 10. The communication control section 104 also transmits the glossary to a predefined mail address. In this case, the communication control section 104 functions as the aforementioned output means. Which of the aforementioned outputs means outputs the glossary is determined based on settings previously received by the operation control section 102 in accordance with operation from the user.

After the processing in step S18, when the communication section 170 has received, from the cloud service 20, information that the text-related information search has failed (YES in step S19 and NO in step S20), the marker processing section 106 complements the search target text with a word to be located behind the marker portion (step S23). Then the marker processing section 106 causes the communication section 170 to transmit, to the cloud service 20, an instruction to search again the complemented text and information related to the complemented text by using the dictionary function (step S24).

In the example illustrated in FIG. 6B, words "get carried" are marked by the dotted line m4. However, "get carried" does not exist as an idiom, and thus search for the meaning thereof by using the ZZZ English-Japanese Dictionary on the cloud service 20 results in failure. This failure may be caused by erroneous marking of the marker portion by the user. Thus, the marker processing section 106 performs complementation with a word "away" to be located behind the "get carried". Word complementation in such a manner permits the cloud service 20 to search for an idiom "get carried away" a meaning of which is assumed to be desired by the user to be searched.

Note that even in a case where the search target text has been complemented with the word to be located behind the marker portion, upon failure in further text-related information search by the cloud service 20, the marker processing section 106 may complement a word to be located further behind. The marker processing section 106 may also perform complementation with a word to be located not behind the marker portion but therebefore.

<Notes>

The embodiment has been described above, referring to a case where the marker portions are detected from the image data to extract the texts indicated by the marker portions and also the dictionary function is specified from the plurality of dictionary functions in accordance with the type of each marker, but in addition to or instead of the marker portions, predefined instructed portions may also be detected.

The storage section 160 previously stores patterns of symbols to be detected as the aforementioned instructed portions. The marker detection section 105 detects the instructed portions from the image data with reference to this information stored in the storage section 160. The marker detection section 105 detects, as the instructed portion, a portion sandwiched by predefined symbols such as "○", "×", "□", "*" or "@" marked with a marker or a pen.

Then the glossary generation section 107 specifies the dictionary function in accordance with a type of the instructed portion. For example, the glossary generation section 107 specifies "English-Japanese dictionary" as a dictionary corresponding to the portion sandwiched by the symbols "○" and specifies "IT terminological dictionary" as a dictionary corresponding to the portion sandwiched by the symbols "×". As described above, the marker detection section 105 detects, as the aforementioned instructed portion, the portion sandwiched by the predefined symbols, thus making it possible to provide a glossary including information related to a text included in a document, such as a meaning of the text, only through simple user operation.

Note that this disclosure is not limited to the configuration of the embodiment described above, and various modifications can be made thereto.

Modified Example 1

FIG. 9 is a flowchart illustrating a flow of operation performed by an image forming apparatus according to Modified Example 1. Note that the same processing as the processing of the flowchart illustrated in FIG. 4 will be marked with same numerals and omitted from a description below.

Figure 10:
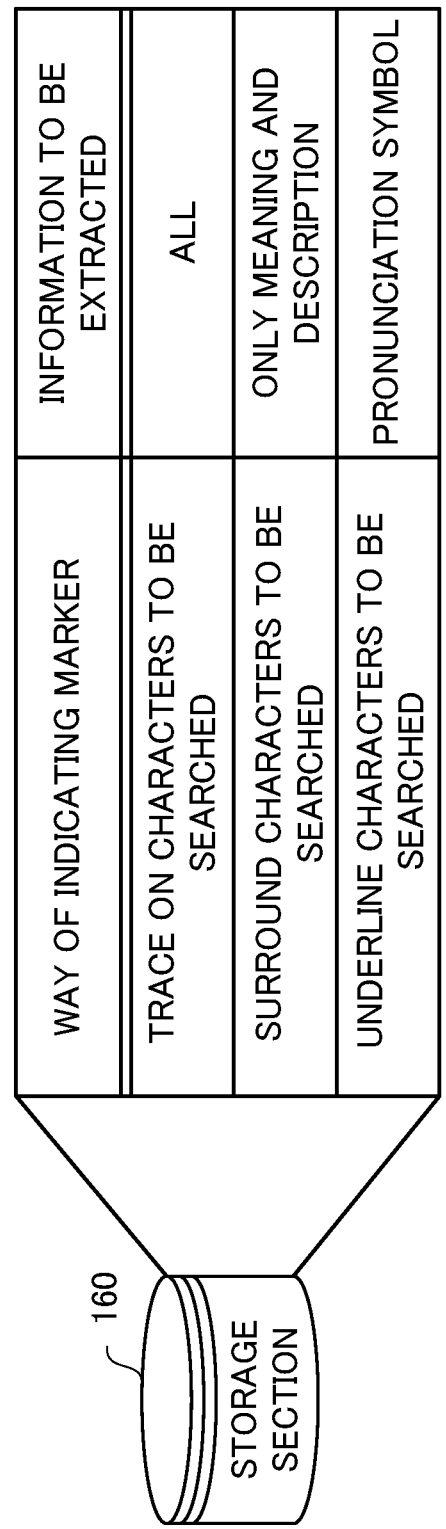
FIG. 10 is a diagram illustrating one example of a second table stored in a storage section of the image forming apparatus according to Modified Example 1.

The storage section 160 of the image forming apparatus according to Modified Example 1 previously stores a second table in addition to the first table described above. FIG. 10 is a diagram illustrating one example of contents of the second table stored in the storage section 160. As illustrated in this figure, the second table is a table which indicates a type of information related to a text corresponding to each way of indicating a marker in a marker portion.

Returning to FIG. 9, after the processing in step S17, the marker processing section 106 specifies the type of the information related to a text corresponding to the way of indicating the marker in the marker portion with reference to the second table (step S30). Then the marker processing section 106 causes the communication section 170 to transmit, to the cloud service 20, the text indicated in the marker portion and an instruction to search, by using the dictionary function, for the information related to the text of the type specified through the processing in step S30 (step S31).

For example, in the example illustrated in FIG. 6B, in a case where the way of indicating the marker in the marker portion indicated by the dotted line m5 is "Surrounding characters to be searched", the marker processing section 106 causes the communication section 170 to transmit, to the cloud service 20, an instruction to search for the information of the types, i.e. only the meaning and the description, included in the information related to the text. As a result, the information related to the pronunciation symbol is not transmitted from the cloud service 20, and the glossary generated through processing in step S21 also serves as a glossary including only a word and a meaning of the word.

On the other hand, in the example illustrated in FIG. 6B, in a case where the way of indicating the marker in the marker portion indicated by the dotted line m5 is "Underlining characters to be searched", the marker processing section 106 causes the communication section 170 to transmit, to the cloud service 20, an instruction to search for only the information of the type, i.e. the pronunciation symbol, included in the information related to the text. As a result, the information related to a meaning of the text is not transmitted from the cloud service 20, and the glossary generated through the processing in step S21 serves as a glossary including only a word and a pronunciation symbol thereof.

As described above, in the image forming apparatus according to Modified Example 1, the user can specify the type of the information related to the text by changing the way of indicating the marker. That is, the user can obtain a glossary including, from the information related to the text, only the information of the type desired to be recognized (for example, the pronunciation symbol).

Note that the way of indicating the marker includes not only ways of lining the marker such as "Surrounding characters to be searched" and "Underlining characters to be searched" described above but also types of a marker such as a color, a line type, and a thickness of the marker.

Modified Example 2

In an image forming apparatus according to Modified Example 2, the glossary generation section 107 specifies the type of the information related to the text corresponding to the way of indicating the marker in the marker portion with reference to the second table. Then the glossary generation section 107 generates a glossary by using, the information related to the text received by the communication section 170, the information related to the text of the type specified above.

Performing the processing described above permits the image forming apparatus according to Modified Example 2 to provide the same effect as that provided by the image forming apparatus according to Modified Example 1.

Modified Example 3

Figure 11A:
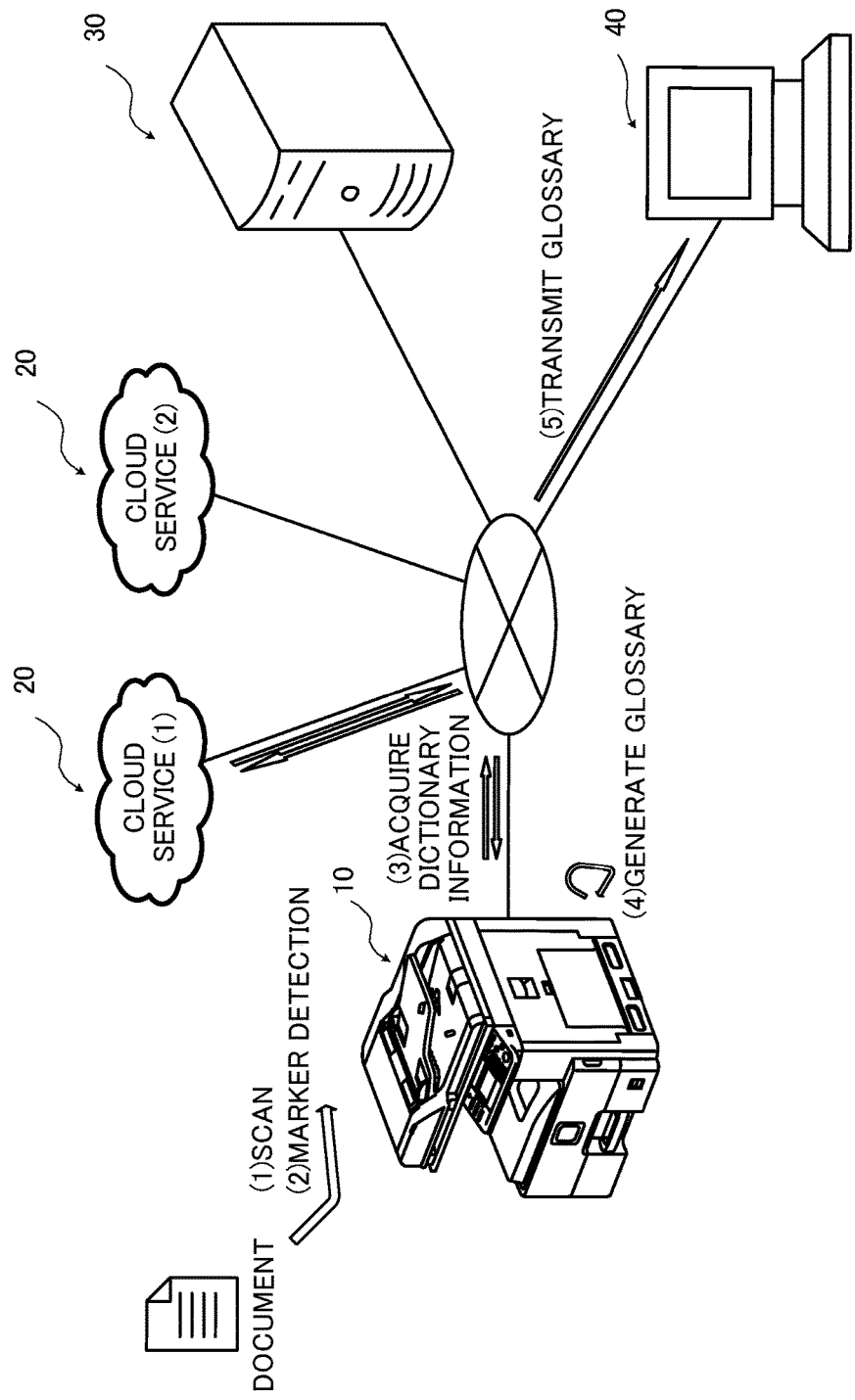
FIG. 11A is a conceptual diagram illustrating the flow of the operation performed by the image forming apparatus according to one example of this disclosure.

FIG. 11A is a diagram illustrating a flow of operation according to the embodiment described above. As illustrated in this figure, the image forming apparatus according to the embodiment described above mainly performs processing (1) to (5) illustrated in the figure. On the other hand, FIG. 11B is a diagram illustrating a flow of operation performed according to Modified Example 3. As illustrated in this figure, configuration according to Modified Example 3 is different from the configuration according to the embodiment described above in a point that glossary generation operation is performed not in the image forming apparatus but the cloud service 20 is caused to perform this processing.

More specifically, in the image forming apparatus according to Modified Example 3, the communication section 170 is caused to transmit, to the cloud service 20, the information related to the text received through processing in step S19 illustrated in FIG. 4 and an instruction for generating a glossary. Then the glossary generated in the cloud service 20 is received by the communication section 170.

As described above, the image forming apparatus according to Modified Example 3 can cause the cloud service 20 (external server) to perform not only dictionary-based search processing but also glossary generation operation, permitting a reduction in loads of information processing imposed on the image forming apparatus.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic device comprising:
    an acquisition section acquiring image data indicating a document;
    a detection section analyzing the image data and detecting a marker portion indicated in the image data;
    a communication section performing communication with either one or a plurality of external servers including at least one of a plurality of dictionary functions;
    a processing section (i) specifying, from the plurality of dictionary functions included in either the one or the plurality of external servers, a dictionary function in accordance with a type of the marker portion, and (ii) causing the communication section to transmit, to the external server including the specified dictionary function, an instruction to search for a text indicated by the marker portion, and for information related to the text, by using the dictionary function;
    a generation section, upon reception of information related to the text as a search result from the external server by the communication section, generating a glossary including the received information related to the text; and
    a storage section storing a first table indicating information for specifying the dictionary function corresponding to each type of a plurality of markers of the marker portion and the external server including the just-mentioned dictionary function,
    wherein with reference to the first table stored in the storage section, the processing section specifies: the dictionary function corresponding to the type of the marker portion detected by the detection section; and the external server to communicate with,
    the detection section further detects a way of indicating a marker in the marker portion,
    the storage section further stores a second table indicating a type of information related to the text corresponding to each way of indicating the marker in the marker portion, and
    the processing section further (i) specifies, with reference to the second table stored in the storage section, the type of the information related to the text corresponding to the way of indicating the marker in the marker portion, and (ii) causes the communication section to transmit, to the external server, an instruction to search for the information related to the text of the specified type by using the dictionary function.

2. The electronic device according to claim 1, wherein the type of the information related to the text includes a meaning of the text and a pronunciation symbol of the text.

3. The electronic device according to claim 1, wherein upon reception of information that the search for the information related to the text has failed from the external server by the communication section, the processing section (i) complements the text with a text to be located either before or behind the marker portion, and (ii) causes the communication section to transmit, to the external server, an instruction to search again for the complemented text and for the information related to the complemented text by using the dictionary function.

4. The electronic device according to claim 1, wherein upon detection of a plurality of marker portions from one piece of image data acquired by the acquisition section, the processing section performs, for each of the plurality of marker portions, processing of specifying the dictionary function and processing of causing the communication section to transmit the instruction to search for the text indicated by the marker portion, and for information related to the text, by using the dictionary function, the communication section receives, from the external server, the information related to the text indicated by each of the plurality of marker portions, and the generation section generates one glossary including the plurality of the information related to the text received by the communication section.

5. The electronic device according to claim 1, further comprising:

a reception section receiving an instruction from a user; and an output section determining an output method from among a plurality of predefined output methods based on the instruction received by the reception section, and outputting, by the determined output method, the glossary generated by the generation section.

6. The electronic device according to claim 1, further comprising a reception section receiving any of processing of registration, alteration, and deletion of the dictionary function corresponding to the type of the marker in accordance with operation from a user, and rewriting the first table stored in the storage section based on the received processing.

7. An electronic device comprising:

an acquisition section acquiring image data indicating a document;

a detection section analyzing the image data and detecting a marker portion indicated in the image data;

a communication section performing communication with either one or a plurality of external servers including at least one of a plurality of dictionary functions;

a processing section (i) specifying, from the plurality of dictionary functions included in either the one or the plurality of external servers, a dictionary function in accordance with a type of the marker portion, and (ii) causing the communication section to transmit, to the external server including the specified dictionary function, an instruction to search for a text indicated by the marker portion, and for information related to the text, by using the dictionary function;

a generation section, upon reception of information related to the text as a search result from the external server by the communication section, generating a glossary including the received information related to the text; and a storage section storing a first table indicating information for specifying the dictionary function corresponding to each type of a plurality of markers of the marker portion and the external server including the just-mentioned dictionary function, wherein with reference to the first table stored in the storage section, the processing section specifies: the dictionary function corresponding to the type of the marker portion detected by the detection section; and the external server to communicate with, the detection section further detects the way of indicating the marker in the marker portion, the storage section further stores a second table indicating a type of information related to the text corresponding to each way of indicating the marker in the marker portion, and the generation section further (i) specifies, with reference to the second table stored in the storage section, the type of the information related to the text corresponding to the way of indicating the marker in the marker portion, and (ii) upon reception of the information related to the text as a search result from the external server by the communication section, generates the glossary by using, out of the received information related to the text, the information related to the text of the specified type.

8. The electronic device according to claim 7, wherein the type of the information related to the text includes a meaning of the text and a pronunciation symbol of the text.

9. The electronic device according to claim 7, wherein upon reception of information that the search for the information related to the text has failed from the external server by the communication section, the processing section (i) complements the text with a text to be located either before or behind the marker portion, and (ii) causes the communication section to transmit, to the external server, an instruction to search again for the complemented text and for the information related to the complemented text by using the dictionary function.

10. The electronic device according to claim 7, wherein upon detection of a plurality of marker portions from one piece of image data acquired by the acquisition section, the processing section performs, for each of the plurality of marker portions, processing of specifying the dictionary function and processing of causing the communication section to transmit the instruction to search for the text indicated by the marker portion, and for information related to the text, by using the dictionary function, the communication section receives, from the external server, the information related to the text indicated by each of the plurality of marker portions, and the generation section generates one glossary including the plurality of the information related to the text received by the communication section.

11. The electronic device according to claim 7, further comprising:

a reception section receiving an instruction from a user; and an output section determining an output method from among a plurality of predefined output methods based on the instruction received by the reception section, and outputting, by the determined output method, the glossary generated by the generation section.

12. An electronic device comprising:
an acquisition section acquiring image data indicating a document;
a detection section analyzing the image data and detecting a marker portion indicated in the image data;
a communication section performing communication with either one or a plurality of external servers including at least one of a plurality of dictionary functions;
a processing section (i) specifying, from the plurality of dictionary functions included in either the one or the plurality of external servers, a dictionary function in accordance with a type of the marker portion, and (ii) causing the communication section to transmit, to the external server including the specified dictionary function, an instruction to search for a text indicated by the marker portion, and for information related to the text, by using the dictionary function;
a generation section, upon reception of information related to the text as a search result from the external server by the communication section, generating a glossary including the received information related to the text; and
a storage section storing a first table indicating information for specifying the dictionary function corresponding to each type of a plurality of markers of the marker portion and the external server including the just-mentioned dictionary function,
wherein with reference to the first table stored in the storage section, the processing section specifies: the dictionary function corresponding to the type of the marker portion detected by the detection section; and the external server to communicate with, and
a reception section receiving any of processing of registration, alteration, and deletion of the dictionary function corresponding to the type of the marker in accordance with operation from a user, and rewriting the first table stored in the storage section based on the received processing.

13. A method for controlling an electronic device including a communication section performing communication with either one or a plurality of external servers including at least one of a plurality of dictionary functions, the method comprising steps of:
acquiring image data indicating a document;
analyzing the image data and detecting a marker portion indicated in the image data;
(i) specifying, with reference to a first table indicating information for specifying the dictionary function corresponding to each type of a plurality of markers of the marker portion and the external server including the just-mentioned dictionary function, the dictionary function corresponding to the type of the marker portion detected by the detection section and the external server including the specified dictionary function, and (ii) causing the communication section to transmit, to the specified external server, an instruction to search for a text indicated by the marker portion, and for information related to the text, by using the dictionary function; and
upon reception of information related to the text as a search result from the external server by the communication section, generating a glossary including the received information related to the text,
the method further comprising steps of:
detecting a way of indicating a marker in the marker portion; and
upon specifying, with reference to a second table indicating a type of information related to the text corresponding to each way of indicating the marker in the marker portion, the type of the information related to the text corresponding to the way of indicating the marker in the marker portion, causing the communication section to transmit as the instruction, to the specified external server, an instruction to search only for information related to the text of the specified type by using the dictionary function.

* * * * *